Patented Nov. 17, 1931

1,832,484

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

DERIVATIVES OF PARA-HYDROXY-DIPHENYL

No Drawing.  Application filed October 11, 1928. Serial No. 311,976.

In the well known process for the manufacture of phenol, wherein chlorobenzene is hydrolyzed with caustic soda solution under pressure at a temperature of 350° to 390° C., about five per cent. of tarry residue is obtained from the purification still. Such residue has been found to contain a high proportion of para-hydroxy diphenyl, or para-phenyl phenol, together with a lesser amount of the isomeric ortho-compound. The aforesaid hydroxy diphenyl compounds have hitherto been prepared only in the laboratory and with much difficulty, so have remained merely chemical curiosities without practical significance.

I have found that these compounds upon proper treatment are capable of yielding useful and commercially valuable derivatives, at least some of which have not been known before. The present invention, broadly stated, comprises certain new and useful compounds derived from the above mentioned para-hydroxy diphenyl as well as useful and novel methods for the preparation thereof.

To the accomplishment of the foregoing and related ends, the invention, then, consists of the methods and products hereinafter fully described and particularly pointed out in the claims, such methods and products, however, constituting but several of the ways and products respectively in which the principle of the invention may be exemplified.

I have found that the aforesaid para-hydroxy diphenyl may be halogenated under suitably controlled conditions whereby the mono-, di- or higher halogenated derivatives are obtained. I am aware that the 3,5-dibromo derivative has previously been prepared (Jour. Am. Chem. Soc. 47; 1454), as well as certain nitro and amino derivatives. However, previous investigators have not succeeded in preparing and isolating the mono-bromo derivative, nor have any of the chloro-derivatives been described in the literature.

I have further found that an amino-group may be substituted for halogen in the halogenated derivatives when such derivatives are heated under pressure with aqueous ammonia in the presence of a cuprous compound as catalyst. Such amino-derivatives, in turn, may be diazotized and coupled with various cyclic amino or phenolic compounds thereby forming valuable dyes. Likewise the alkyl ethers of para-hydroxy diphenyl, and of the above mentioned derivatives thereof, may be prepared by treating with alkylating agents in the usual way.

Representative compounds of the several types in question, as well as suitable methods for the preparation thereof, are described in the following examples:

*1. 3-chloro-4-hydroxy diphenyl*

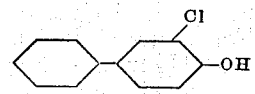

One mole para-hydroxy diphenyl is dissolved in one mole caustic soda and six liters water, the solution cooled and a solution containing one mole sodium hypochlorite added slowly with constant stirring. The reaction mixture is allowed to stand for about one hour, then warmed to about 40° C., filtered and, after cooling, the 3-chloro compound precipitated from the filtrate with hydrochloric acid. Fine colorless crystals. M. P. 77° C.

*2. 3.4-chloro-methoxy-diphenyl*

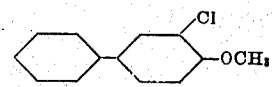

An alkaline solution of one mole of the preceding compound is treated with one and one-eighth moles of methyl sulphate, with stirring. The methyl ether precipitates out. To complete the reaction the mixture is warmed to 50° to 60° C. for about one half hour, then cooled and the crystals filtered off. Fine colorless crystals. M. P. 91°–92° C.

*3. 3.4-bromo-methoxy-diphenyl*

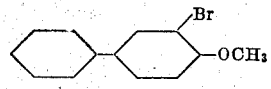

Formed by similar method to (1) and (2). Fine colorless crystals. M. P. 61°–63° C.

4. *3.4-amino-methoxy-diphenyl*

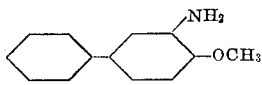

One mole of the 3-chloro compound is heated under pressure with five moles aqueous ammonia and one half mole cuprous oxide at a temperature of 200° to 220° C. for 15 hours with thorough agitation. The reaction product is dissolved in a solvent immiscible with water such as benzene, ether, etc., and extracted therefrom with dilute mineral acid. The HCl salt is sparingly soluble in water, from which it crystallizes in colorless needles. The pure amino base is precipitated from the solution of its salt by treatment with an alkali. Colorless crystals. M. P. 79° C.

The foregoing specific examples are merely illustrative of certain convenient methods of procedure for the preparation of the general classes of compounds herein referred to. While in some of the examples the formation of a methyl ether is described, it is equally feasible to prepare an ethyl or other alkyl ether by the use of an appropriate alkylating agent. Furthermore, I do not limit myself to the specific reagents as stated in the examples, for other related compounds in certain cases are adapted to the type of reaction in question and may be used, if desired, to prepare products of the above general description. For example, instead of sodium hypochlorite as chlorinating agent, I may use calcium, or other hypochlorite, or chlorine gas. For the formation of a mono-chloro-derivative, a hypochlorite solution is to be preferred, whereas with chlorine directly the tendency is toward the production of di- or higher chlorinated derivatives. Likewise brominated derivatives may be made by employing the corresponding brominating agents. While methyl sulphate is specifically referred to in the example, I may use other methylating, or alkylating, agents such as a methyl or alkyl halide. It is also evident that, in some cases at least, the sequence of operations may be varied without change in the end-product obtained, and it is to be understood that such change may be made without departing from the principle of the invention, provided the steps or ingredients stated by any of the following claims, or the equivalent of such stated steps or ingredients, be employed.

I therefore particularly point out and distinctly claim as my invention:—

1. The method of making a derivative of para-hydroxydiphenyl, which comprises reacting the latter with a hypohalite of the group consisting of a hypochlorite and a hypobromite.

2. The method of making a derivative of para-hydroxydiphenyl, which comprises reacting para-hydroxydiphenyl in alkaline solution with approximately an equimolecular amount of a sodium hypohalite from the group consisting of a hypochlorite and a hypobromite.

3. In a method of making a derivative of para-hydroxydiphenyl, the step which consists in reacting upon the latter with a hypochlorite solution.

4. In a method of making 3-chloro-4-hydroxydiphenyl, the step of reacting para-hydroxydiphenyl with approximately an equimolecular amount of sodium hypochlorite in alkaline solution.

5. In a method of making a brominated para-hydroxydiphenyl, the step of reacting upon para-hydroxydiphenyl with a hypobromite solution.

6. In a method of making 3-bromo-4-hydroxydiphenyl, the step of reacting para-hydroxydiphenyl with approximately an equimolecular amount of sodium hypobromite in alkaline solution.

7. As a new product, a chlorinated-para-hydroxydiphenyl, containing at least one chlorine group preparable by reacting para-hydroxydiphenyl with a hypochlorite in alkaline solution.

8. As a new product, 3-chloro-4-hydroxy diphenyl.

Signed by me this 5th day of October, 1928.

ERNEST F. GRETHER.